(12) United States Patent
Meggiolan

(10) Patent No.: US 10,994,572 B2
(45) Date of Patent: May 4, 2021

(54) BICYCLE WHEEL HUB AND RELATED HUB ASSEMBLY

(71) Applicant: Campagnolo S.r.l., Vicenza (IT)

(72) Inventor: Mario Meggiolan, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 354 days.

(21) Appl. No.: 16/056,872

(22) Filed: Aug. 7, 2018

(65) Prior Publication Data

US 2019/0047323 A1 Feb. 14, 2019

(30) Foreign Application Priority Data

Aug. 8, 2017 (IT) .................. 102017000091932

(51) Int. Cl.
| | |
|---|---|
| *B60B 27/00* | (2006.01) |
| *B60B 1/00* | (2006.01) |
| *B60B 27/02* | (2006.01) |
| *B60B 1/04* | (2006.01) |
| *B62L 1/00* | (2006.01) |
| *F16D 65/12* | (2006.01) |

(52) U.S. Cl.
CPC .......... *B60B 27/0052* (2013.01); *B60B 1/003* (2013.01); *B60B 1/042* (2013.01); *B60B 27/023* (2013.01); *B60B 2900/211* (2013.01); *B60Y 2200/134* (2013.01); *B62L 1/00* (2013.01); *F16D 65/123* (2013.01)

(58) Field of Classification Search
CPC ... B60B 27/0052; B60B 27/023; B60B 1/042; B60B 1/003
See application file for complete search history.

(56) References Cited

U.S. PATENT DOCUMENTS

| | | | | |
|---|---|---|---|---|
| 7,306,292 | B2* | 12/2007 | Muraoka | B60B 27/023 |
| | | | | 301/61 |
| 7,331,639 | B2* | 2/2008 | Okajima | B60B 1/041 |
| | | | | 301/58 |
| 9,267,560 | B2* | 2/2016 | Nakakura | F16D 65/12 |
| 10,549,575 | B2* | 2/2020 | Spahr | B60B 1/0246 |
| 2004/0140709 | A1* | 7/2004 | Kanehisa | B60B 27/0078 |
| | | | | 301/110.5 |
| 2008/0116738 | A1 | 5/2008 | Urbani et al. | |
| 2008/0157585 | A1* | 7/2008 | Meggiolan | B60B 27/0005 |
| | | | | 301/110.5 |

FOREIGN PATENT DOCUMENTS

| | | | | |
|---|---|---|---|---|
| CN | 103 953 670 A | | 7/2014 | |
| DE | 202011101081 U1 | * | 10/2011 | .......... B60B 27/023 |
| EP | 1 288 117 A2 | | 3/2003 | |
| GB | 2 531 408 A | | 4/2016 | |
| TW | M 274 312 U | | 9/2005 | |

OTHER PUBLICATIONS

Italian Search Report and Written Opinion in Italian Application No. 102017000091932, dated Apr. 5, 2018, with English translation.

* cited by examiner

*Primary Examiner* — Kip T Kotter
(74) *Attorney, Agent, or Firm* — Volpe Koenig

(57) ABSTRACT

A bicycle wheel hub for mounting a brake disc in relation to a spoke-holding flange. The hub has a connection portion with a first annular sector that is axially external with respect to the spoke-holding flange and a second annular sector that is axially external with respect to the first annular sector. A circumferential groove axially arranged between the first and the second annular sectors.

21 Claims, 7 Drawing Sheets

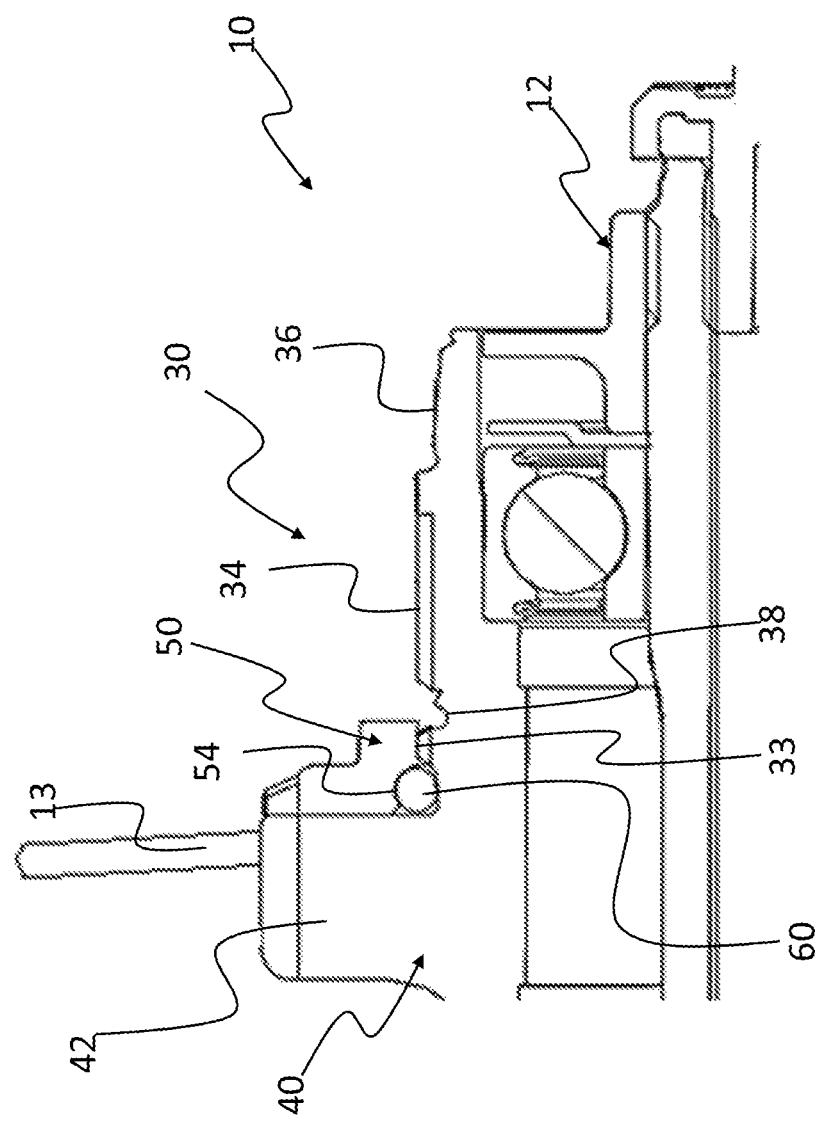

BICYCLE WHEEL HUB AND RELATED HUB ASSEMBLY

CROSS REFERENCE TO RELATED APPLICATION

This application claims the benefit of Italian Patent Application No. 102017000091932, filed on Aug. 8, 2017, which is incorporated herein by reference as if fully set forth.

FIELD OF INVENTION

The present invention relates to a bicycle wheel hub.

The present invention also relates to a bicycle wheel hub assembly comprising such a hub. In particular, the wheel hub is configured to receive a brake disc in wheel hub assembly, which is most preferably a racing bicycle.

BACKGROUND

As known, it is now common in bicycles to use disc brakes.

Disc brakes are indeed often preferred to conventional brakes of different design in that they ensure a high braking force and a better modularity that allows a marked braking sensitivity, as well as being less subject to problems caused by mud or water.

Typically, a disc brake comprises a brake caliper fixed onto the frame of the bicycle and a brake disc mounted on the hub of the wheel. Inside the brake caliper there are two or four opposite brake pads. The brake disc rotates inside the space defined between the opposite pads between which the brake disc rotates. By actuating the brake lever, the pads are brought closer to the brake disc, generating friction on the brake disc and, consequently, braking the wheel.

The brake disc usually comprises a radially outer braking track connected to a radially inner portion provided with a fitting hole onto the hub of the wheel.

The brake disc is made to rotate as a unit with the hub of the wheel through bolts or, in the most recent and highest performance solutions, by a shape coupling between the outer surface of the hub and the inner surface of the fitting hole of the brake disc.

It is important for the brake disc, and in particular the braking track, to be perfectly perpendicular to the rotation axis of the hub.

Indeed, a non-perfect perpendicularity leads to oscillations of the brake disc during the rotation of the wheel that cause variations of the relative position between the braking track and the pads of the brake caliper. The brake disc can thus slide accidentally, with frequencies that depend on the rotation speed of the wheel, against the pads of the brake caliper with clear drawbacks.

It is furthermore important for the braking track to be perfectly centered between the pads of the brake caliper, so as to avoid continuous and accidental sliding between the braking track and the pads of the brake caliper. The correct centering of the brake disc between the pads of the brake caliper is also essential to ensure that the pads arranged on opposite sides of the brake disc act simultaneously on it, so as to make the progressive wearing thereof uniform.

Concerning this, bicycle wheel hubs usually comprise an annular shoulder against which the brake disc is mounted in abutment.

Such an annular shoulder is formed on the hub in an axial position such as to allow the brake disc, when mounted on the hub, to be positioned exactly centered between the pads of the brake caliper.

However, the constructive tolerances in the manufacturing step both of the hub and of the brake disc, although very narrow and well respected, are of a size such as not to always be able to ensure that the brake disc is arranged exactly centered between the pads of the brake caliper and that the annular shoulder is perfectly perpendicular to the rotation axis of the hub.

It is known to work with a machine tool on the annular shoulder of the hub to ensure a perfect planarity and a perfect perpendicularity thereof with respect to the rotation axis of the hub.

However, such mechanical processing is not always possible, especially in the case in which the hub is made of metallic alloys, like for example Ergal (aluminum alloys of group 7000) or Avional (aluminum alloys of group 2000), with extremely high mechanical performance but which require a surface coating of the surfaces worked with a machine tool to avoid oxidation thereof.

The working with a machine tool of the annular shoulder would indeed remove the surface coating, exposing the bare material to oxidation processes.

Furthermore, even after mechanical processing of the annular shoulder it is not always possible to ensure that the brake disc, once the wheel is mounted on the bicycle, is positioned exactly centered between the pads of the brake caliper.

Document U.S. Pat. No. 9,267,560 B2 describes a bicycle wheel hub comprising an adjustment mechanism of the axial position of the brake disc with respect to the hub. The adjustment mechanism comprises an elastic element, such as a spring, active between an annular shoulder and the brake disc to push the brake disc towards the free end of the hub. The brake disc is locked in a predetermined axial position by locking members, such as a bush, active on the hub and on the brake disc on the opposite side with respect to the elastic element, counteracting the pushing action thereof on the brake disc. By selecting the axial position in which to activate the locking members it is possible to select the axial position of the brake disc.

This solution, devised to allow the brake disc to be positioned centered between the pads of the brake caliper, might not ensure the perfect perpendicularity between the brake disc and the rotation axis of the hub, since the elastic element does not allow a surface to be made that is stable and perfectly flat for the brake disc to rest on.

SUMMARY

The present invention concerns a bicycle wheel hub comprising a connection portion to a brake disc and at least one spoke-holding flange arranged axially inward with respect to said connection portion. The connection portion has rotational coupling members with a first annular sector that is axially external to the spoke-holding flange and a second annular sector that is axially external from the first annular sector. A circumferential groove is axially arranged between the first annular sector and the spoke holding flange. The circumferential groove is dimensioned to receive an annular gasket.

BRIEF DESCRIPTION OF THE DRAWINGS

The features and advantages of the invention will become clearer from the description of preferred embodiments thereof, made with reference to the attached drawings, where:

FIG. 3A is an enlargement of a portion of the section of FIG. 3 with some parts removed to better highlight others;

DETAILED DESCRIPTION OF THE PREFERRED EMBODIMENTS

Figure 2:
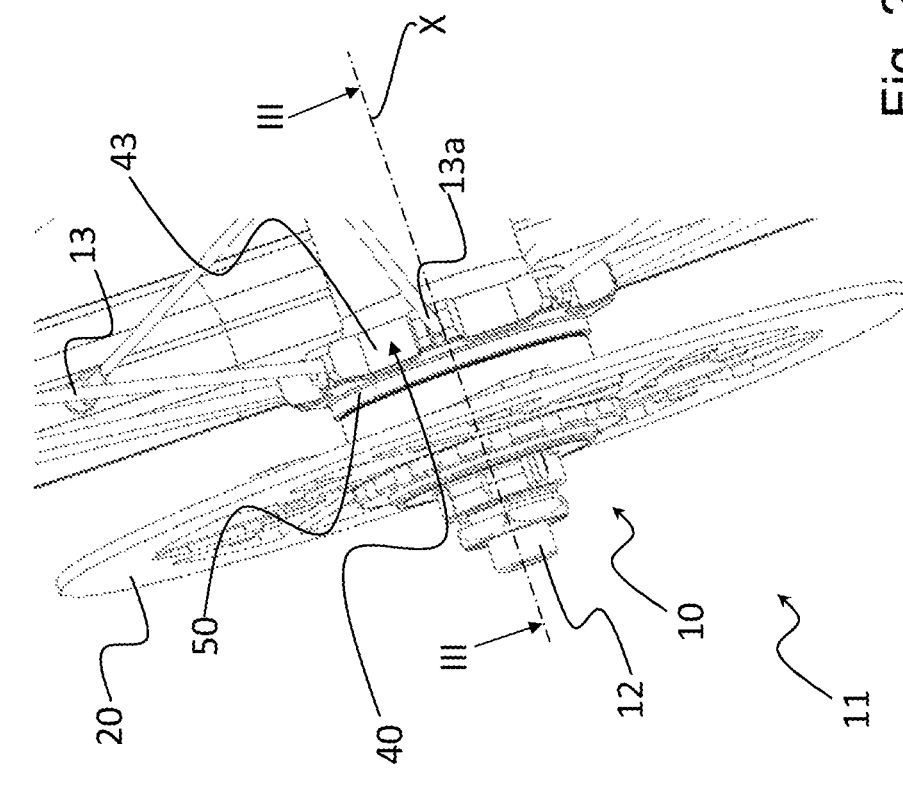
FIG. 2 is an enlarged perspective view of a portion of the bicycle wheel of FIG. 1, seen from another point of view with respect to that of FIG. 1.

In the present description and in the following claims, the terms "axial", "axially", "longitudinal", "longitudinally" and similar refer to a direction substantially coinciding with or substantially parallel to a rotation axis of the hub, whereas the terms "radial", "radially" and similar refer to a direction that lies in a plane substantially perpendicular to the rotation axis of the hub and that passes through such a rotation axis.

The expressions "axially inner" and "axially outer" are meant to respectively indicate axial positions further away from and closer to an axial end of the hub. Thus, the spoke attachment portion of the hub is "axially inner."

The expressions "radially inner" and "radially outer" are meant to respectively indicate radial positions closer to and further away from the axis/rotation axis of the hub.

The first rotational coupling members are configured to receive and rotationally hold a brake disc on the hub.

The Applicant has perceived that by providing two annular sectors of the first rotational coupling members, the axially innermost annular sector, namely the first annular sector, can be used to receive a spacer that can act as a striking and reference element for the axial positioning of the brake disc on the hub.

The Applicant has further perceived that by separating the two annular sectors of the first rotational coupling members with a circumferential groove, an axially outer surface of the spacer can be worked with a machine tool, for example by chip removal, when the spacer is already fitted on the hub.

The circumferential groove indeed makes a recess that radially spaces the first annular sector (and therefore the spacer fitted onto it) from the outer surface of the hub, allowing a tool to intercept the entire axially outer surface of the spacer.

This makes it possible to machine the axially outer surface of the spacer to make it perfectly planar and perfectly perpendicular to the rotation axis of the hub.

The brake disc can thus be fitted onto the second annular sector of the first rotational connection members striking the axially outer surface of the spacer and being positioned perfectly perpendicular to the direction of rotation of the hub.

By arranging the first annular sector of the first rotational connection members with a predetermined and calculated axial extension, and by consequently arranging the axial position of the circumferential groove, it is furthermore possible to select a spacer that positions the brake disc exactly centered between the pads of the brake caliper.

The machinability of the spacer is ensured by the fact that the spacer can be made of any material that is not subject to oxidation even without surface coating layers.

The Applicant has indeed perceived that the spacer is not subjected to great mechanical stresses (except during machining), since its structural function is simply to act as an abutment for the brake disc.

In this way, the hub can be made from a material that maximizes performance in terms of mechanical strength and lightness and can be coated with a layer that prevents the oxidation thereof.

Hereinbelow, preferred features of the bicycle wheel hub according to the present invention are described, which can be provided singularly or in combination.

Preferably, the first and the second annular sector comprise respective pluralities of radial projections, circumferentially spaced, and having rectilinear extension in the axial direction.

Advantageously, such radial projections form conventional ribbing, on which conventional brake discs can be mounted, provided with matching ribbing.

Preferably, said radial projections of the first and second annular sector are axially aligned with each other; the extension in the radial direction of a projection being equal to the extension in the radial direction of any other radial projection of the first and second annular sector.

More preferably, the radial projections of the first annular sector have extension in the radial and circumferential direction equal to that of the corresponding projections of the second annular sector.

Advantageously, the two ribbings of the first and second annular sector are substantially the same, and this makes it possible to calibrate the spacer with a matching ribbing, so that the ribbing of the spacer manages to engage the first sector passing through the second. In other words, the spacer is mounted on the hub making it slide firstly in the second annular sector and then in the first annular sector Preferably, the extension in the axial direction of the second annular sector is greater than the extension in the axial direction of the first annular sector and the extension in the axial direction of the circumferential groove is less than the axial extension of the first annular sector.

Advantageously, in this way there is axial space to receive brake discs that have a central portion of conventional axial dimensions. Furthermore, jamming does not occur when the spacer is inserted passing from the second to the first annular sector because the groove is completely passed over by the spacer.

Preferably, said spoke-holding flange comprises a plurality of appendages extending radially each of which comprises a respective seat configured to receive an end of a spoke; said seats comprising an insertion opening facing towards said first annular sector of the first rotational coupling members.

Advantageously, a spoke-holding flange of this type allows low axial occupied space, in particular generally less than a conventional spoke-holding flange having spoke-receiving seats canti-levered in the axial direction and provided with insertion openings facing the opposite side with respect to the connection portion to the brake disc. In this way, the axial space available for the connection portion of the hub is increased, so as to allow the use of the spacer, keeping the same overall axial dimensions of the hub. It should also be observed that, with respect to the aforementioned conventional spoke-holding flange, the absence of spoke-receiving seats canti-levered in the axial direction eliminates flexing of the spoke-receiving seats that could lead to undesired breaking.

Preferably, a circumferential seat for an annular gasket is axially arranged between the spoke-holding flange and the first annular sector of the first rotational coupling members.

Preferably, the annular gasket can be radially arranged between an outer surface of the hub and an inner surface of the spacer.

The annular gasket allows the spacer to be held (by mechanical interference of the annular gasket between hub and spacer) axially on the hub, allowing easy positioning of the hub and of the spacer on the machine tool (as will be specified hereinafter).

In a second aspect thereof, the present invention relates to a bicycle wheel hub assembly comprising:

a hub comprising a connection portion to a brake disc and at least one spoke-holding flange axially inner with respect to said connection portion, wherein said connection portion comprises first rotational coupling members, said first rotational coupling members comprising a first annular sector, axially outer with respect to said spoke-holding flange, and a second annular sector, axially external with respect to the first annular sector, said connection portion further comprising a circumferential groove axially arranged between the first and the second annular sector of the first rotational coupling members;

a spacer comprising a striking surface for a brake disc, an abutment surface axially opposite the striking surface, and a central opening provided with second rotational coupling members matching the first rotational coupling members;

wherein said spacer is fitted onto said connection portion with said second rotational coupling members engaged on said first annular sector of the first rotational coupling members, with said abutment surface facing towards said spoke-holding flange and with said striking surface axially arranged at said circumferential groove.

Preferably, said hub comprises one or more of the features of the wheel hub described above.

The spacer acts as a striking and reference element for the axial positioning of the brake disc on the hub.

Separating the two annular sectors of the first rotational coupling members with the circumferential groove, an axially outer surface of the spacer can be machined, for example by chip removal, when the spacer is already fitted onto the hub.

Due to the fact that the striking surface is axially arranged at the circumferential groove, the circumferential groove defines a recess that radially spaces the first annular sector (and therefore the spacer fitted on it) from the outer surface of the hub, allowing a tool to intercept the entire axially outer surface of the spacer.

The expression "at" referring to the position of the striking surface of the spacer with respect to the circumferential groove, is meant to indicate a position of the striking surface that is axially comprised in the radial projection of the circumferential groove.

In other words, the striking surface of the spacer is axially arranged between two shoulders that define the axial extension of the circumferential groove.

Preferably, said striking surface is levelled/ground through chip removal machine processing.

Advantageously, the axially outer surface of the spacer is made perfectly planar and perfectly perpendicular to the rotation axis of the hub.

The brake disc is thus fitted onto the second annular sector of the first rotational connection members striking the axially outer surface of the spacer and being positioned perfectly perpendicular to the direction of rotation of the hub.

Preferably, said abutment surface of the spacer contacts said spoke-holding flange.

Advantageously, by selecting the radial dimensions of the spacer, it is possible to create a shoulder for the ends of the spokes inserted in the spoke-holding flange. This is particularly advantageous when spoke-holding flanges of the radial type are used. In these flanges the end of the spoke is inserted axially in the seat of the spoke-holding flange and remains in the seat since the spoke is mounted with a certain traction between rim of the bicycle wheel and hub. In the case of irregularity of the terrain (for example holes) or in the case of an accident, the spoke could discharge and no longer be under tension, with possible axial withdrawal of the end of the spoke from the seat of the spoke-holding flange. The shoulder created by the spacer prevents this from happening.

Preferably, said spacer comprises a plurality of appendages extending radially; each appendage of the spacer comprising a small block at least partially inserted in a respective insertion opening of the seats of the spoke-holding flange.

Advantageously, the small blocks serve the purpose of preventing dirt, mud and dust being able to slip into the seat of the end of the spoke. The number of appendages of the spacer is equal to the number of appendages of the spoke-holding flange.

Preferably, the hub assembly according to the present invention comprises an annular gasket radially arranged between an outer surface of the hub and an inner surface of the spacer.

Advantageously, thanks to the interference that is created with the spacer, the annular gasket allows the positioning of the spacer to be maintained, before the machining on the striking surface of the spacer itself, avoiding the withdrawal from the connection portion of the hub.

Preferably, the hub assembly according to the present invention comprises at least one thickening washer arranged axially external to the spacer, at said striking surface.

Preferably, all of the thickening washers have the same thickness, in other words the same dimension in the axial direction.

Preferably, the thickness of the thickening washers is comprised between about 0.2 mm and 0.02 mm, preferably it is 0.05 mm.

Advantageously, by selecting the number of thickening washers, it is possible to position the brake disc exactly centered between the pads of the brake caliper.

Preferably, said spacer is formed from a radially inner annular portion, comprising said striking surface, and from a radially outer annular portion, associated with said radially inner annular portion.

Advantageously, it is possible to make the spacer from two different materials, using any machinable material that is not subject to oxidation even without surface coating layers for the radially inner annular portion.

Preferably, said radially outer annular portion comprises said plurality of appendages extending radially.

Advantageously, it is possible to make the radially outer annular portion of the spacer from plastic material.

Figure 1:
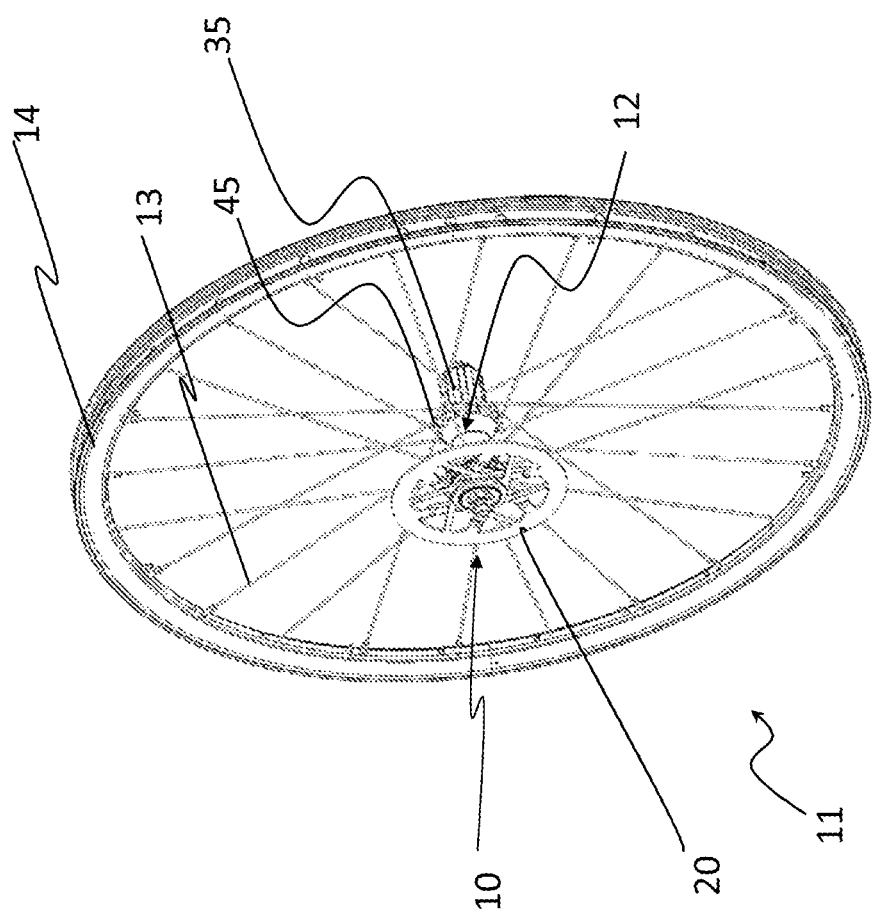
FIG. 1 is a perspective view of a bicycle wheel, comprising a hub assembly according to the present invention.

With reference now to the drawing figures, reference numeral 10 wholly indicates a bicycle wheel hub assembly according to the present invention. FIGS. 1 and 2, as an example and not for limiting purposes, illustrate a rear bicycle wheel 11.

The hub assembly 10 comprises a hub 12 suitable for receiving a brake disc 20.

The hub 12 is mounted on a frame of the bicycle between two opposite support arms of the rear wheel 11 at the respective free end portions of which housing seats of opposite free end portions of the hub 12 are provided.

A caliper (not illustrated) of a disc brake is fixed onto the frame of the bicycle. In particular, the caliper is fixed in a conventional manner to one of the support arms of the wheel 11.

Inside the caliper there are at least two opposite brake pads.

The brake disc 20 rotates inside the space defined between the opposite brake pads. By actuating the brake lever (not illustrated), the brake pads are brought towards the brake disc 20, generating friction on the brake disc 20 and, consequently, braking the wheel 11.

The hub 12 extends along a longitudinal axis X that coincides with the rotation axis of the bicycle wheel and of the brake disc 20 (FIG. 2).

The hub 12 comprises a connection portion 30 to the brake disc 20, for receiving and locking in rotation the brake disc 20, and a pair of spoke-holding flanges 40 and 45, to which two respective pluralities of spokes 13 of the wheel 11 are fixed.

In the illustrated non-limiting case of a rear wheel 11, the hub 12 comprises a connection portion 35 to a cassette (not illustrated).

The connection portion 30 to the brake disc 20 is arranged axially outer with respect to the spoke-holding flange 40, and the connection portion 35 to the cassette is arranged axially outer with respect to the spoke-holding flange 45. The connection portion 30 to the brake disc 20 is thus axially opposite the connection portion 35 to the cassette.

The spokes 13 are placed under tension between the spoke-holding flanges 40 and 45 and the rim 14 of the wheel 11. The spokes 13 are preferably made of steel or aluminum alloy.

Figure 4:
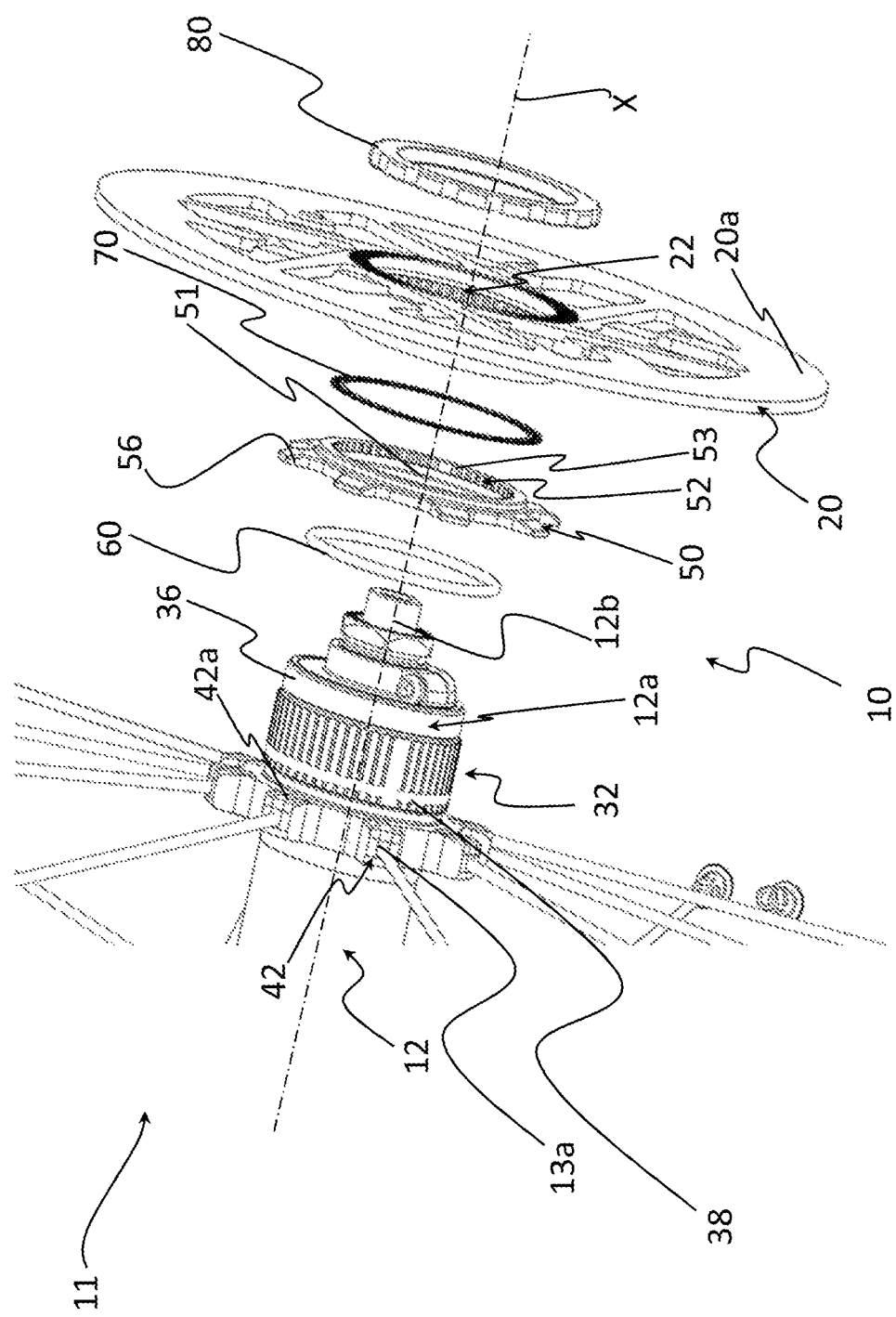
FIG. 4 is an exploded perspective view of the hub assembly of FIG. 1.

As illustrated in FIGS. 2 and 4, the spoke-holding flange 40 comprises a plurality of appendages 42 extending radially each of which comprises a respective seat 42a configured to receive an end of a spoke 13.

The appendages 42 are connected to a central crown 43 of the spoke-holding flange 40 which is connected to the hub 12. Preferably, the central crown 43 is in one piece with the hub 12 and the appendages 42 are in one piece with the central crown 43.

Figure 5:
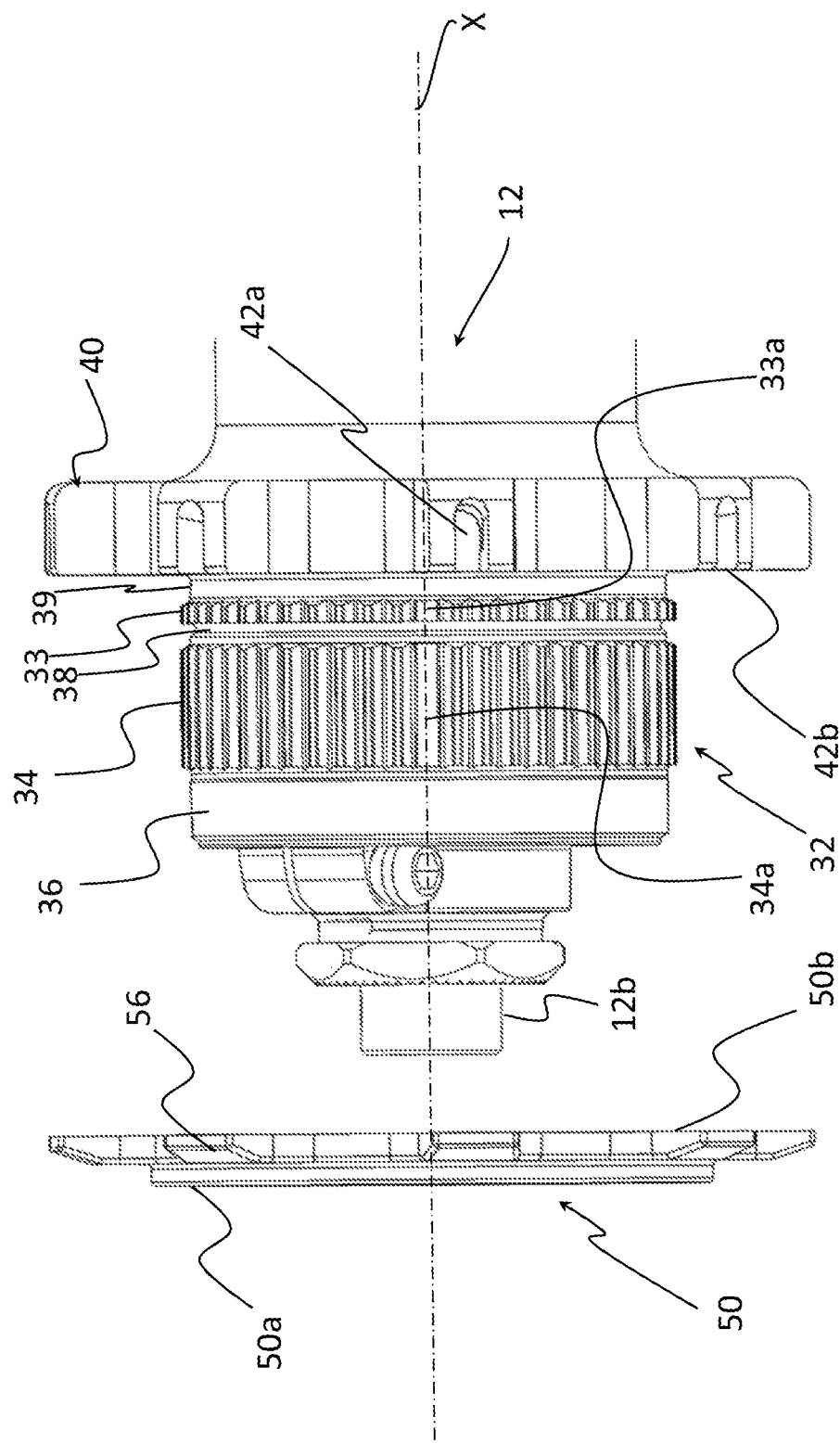
FIG. 5 is an exploded side view of some parts of the hub assembly of FIG. 4.

The seats 42a comprise an insertion opening 42b facing towards the connection portion 30, as better illustrated in FIG. 5. Each spoke 13 is inserted, through the insertion opening 42b, in a respective seat 42a so that an end portion 13a of the spoke 13 (FIG. 2) provided with a head (not illustrated) is radially held inside the seat 42a.

The tensioning of the spoke 13 ensures that the spoke 13 cannot translate axially inside the seat 42a and come out from it.

The connection portion 30 of the hub 12 is formed on a hub body 12a that makes a radially outer surface of the hub 12. The hub body 12a is axially crossed, in radially inner position, by a hub pin 12b with respect to which the hub body 12a is rotatable about the rotation axis of the wheel 11. The hub pin 12b defines the rotation axis of the wheel 11.

The connection portion 30 comprises first rotational coupling members 32 to receive and rotationally hold the brake disc 20.

The first rotational coupling members 32 are configured to be able to exchange pairs of forces between the brake disc 20 and the hub 12, so that the brake disc 12 can transfer the braking torque to the wheel 11.

The first rotational coupling members 32 do not make any axial coupling between the hub 12 and the brake disc 20.

The first rotational coupling members 32 comprise a first annular sector 33, axially external with respect to the spoke-holding flange 40, and a second annular sector 34, axially external with respect to the first annular sector 33.

The first annular sector 33 is axially closer to the spoke-holding flange 40 with respect to the second annular sector 34.

The first and second annular sector 33, 34 are shaped according to a shape coupling profile. With this term it is meant that the profile of the first and second annular sector 33, 34 have geometric features such as to allow the transmission of a torsion between the hub 12 and the brake disc 20. A shape coupling profile can for example be a polygonal profile, or a circular profile with an alteration (for example, levelled along a cord), and similar.

Concerning this, the first 33 and the second annular sector 34 comprise a fluted radially outer surface, in other words a radially outer surface that extends longitudinally and is provided with longitudinal flutes 33b, 34b defined between adjacent rectilinear radial projections 33c, 34c in the axial direction and projecting in the radial direction.

All of the radial projections 33c, 34c of the first and second annular sector 33, 34 have equal extension in the radial direction.

The radial projections 33c, 34c and the longitudinal flutes 33b, 34b of the first and second annular sector 33, 34 are axially aligned with each other.

In the circumferential direction, the radial projections 33c, 34c can have the same extension (like in the example illustrated in the attached figures) or at least one radial projection 33c, 34c can have a greater circumferential extension with respect to the other radial projections 33c, 34c to define a radial reference projection.

The circumferential distance between the radial projections 33c, 34c (which defines the longitudinal flutes 33b, 34b) can be constant or, preferably, at least two radial projections 34c can be spaced by a greater circumferential distance with respect to the circumferential distance that separates the other radial projections, so as to define a longitudinal reference flute 33a, 34a (as illustrated in FIG. 5).

The first and second annular sector 33, 34 are identical to one another except for the respective extension in the axial direction that is different.

Figure 6:
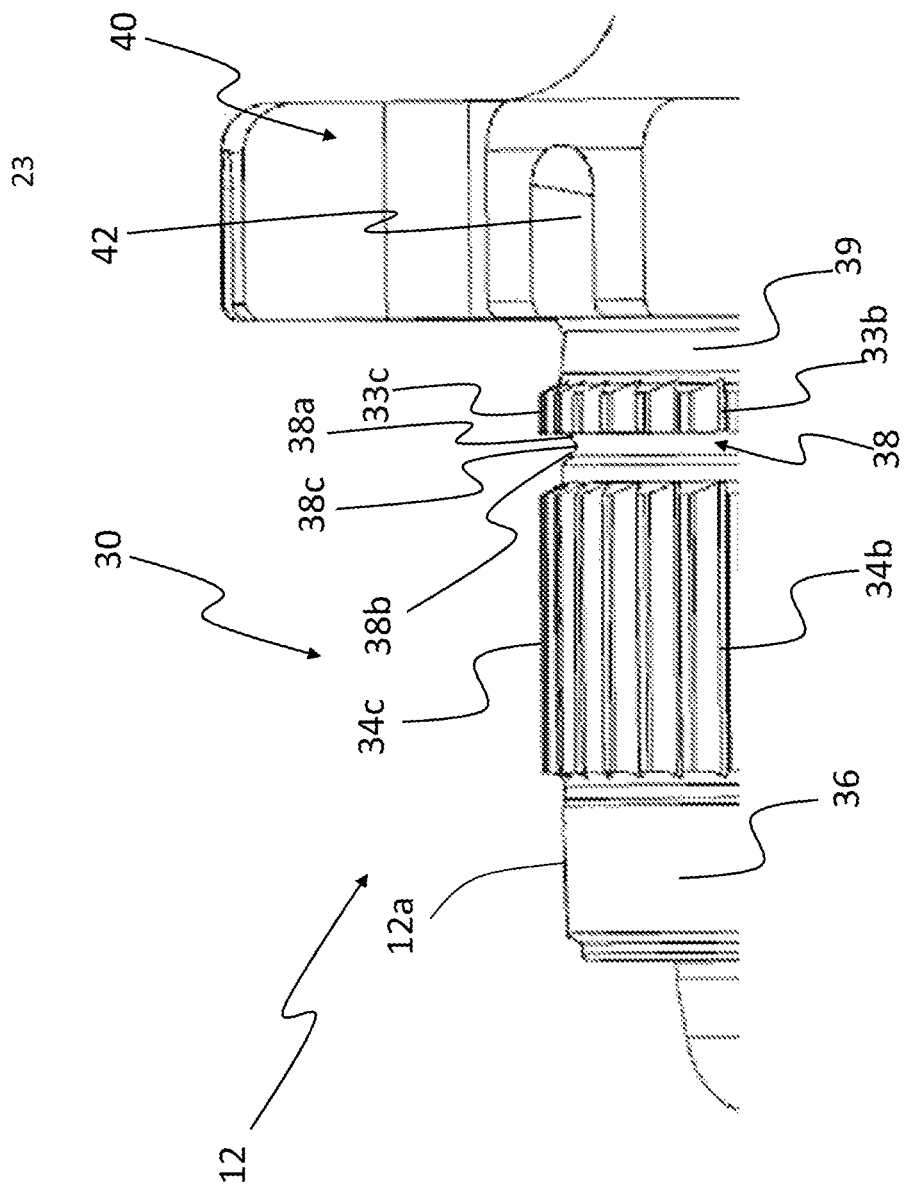
FIG. 6 is an enlargement of a detail of the exploded side view of FIG. 5.

As clearly illustrated in FIG. 6, the extension in the axial direction of the second annular sector 34 is greater than the extension in the axial direction of the first annular sector 33.

The connection portion 30 further comprises a circumferential groove 38 that separates the first and second annular sector 33, 34 from one another.

The circumferential groove 38, axially arranged between the first and the second annular sector 33, 34, has a greater radial depth than the radial depth of the flutes 33b, 34b of the first and second annular sector 33, 34.

In particular (FIG. 6), the groove 38 is defined between a first and a second annular shoulder 38a, 38b and a bottom wall 38c.

The first annular shoulder 38a is adjacent to the first annular sector 33 and the second shoulder 38b is adjacent to the second annular shoulder 34.

Each annular shoulder 38a, 38b extends radially outwards not beyond the flutes 33b, 34b of the first and second annular sector 33, 34.

Preferably, each annular shoulder 38a, 38b extends radially outwards until the outer surface of the hub body 12a is reached.

Each annular shoulder 38a, 38b extends radially inwards until it joins with the bottom wall 38c.

The bottom wall 38c is therefore arranged radially more internal than the flutes 33b, 34b of the first and second annular sector 33, 34.

In other words, the circumferential groove 38 defines a recess that spaces the first 33 from the second annular sector 34.

The extension in the axial direction of the groove 38, in other words the distance between the first and the second shoulder 38a, 38b, is preferably less than the extension in the radial direction of the first annular sector 33.

The hub assembly 10 further comprises a spacer 50 configured to act as striking and reference element for the axial positioning of the brake disc 20 on the hub 12.

The spacer 50 has a substantially annular shape and comprises a striking surface 50a for the brake disc 20 and an abutment surface 50b axially opposite the striking surface 50a.

The spacer 50 further comprises a central opening 51 provided with second rotational coupling members 52 matching the first rotational coupling members 32.

The second rotational coupling members 52 comprise a fluted radially inner surface 53 matching the fluted surface of the first rotational coupling members 32 of the first annular sector 33.

The fluted radially inner surface 53 extends longitudinally and is provided with longitudinal flutes 53a defined between adjacent rectilinear radial projections 53b in the axial direction and projecting in the inner radial direction.

The longitudinal flutes 53a match the radial projections 33c of the first annular sector 33 and the radial projections 53b match the longitudinal flutes 33b of the first annular sector 33.

All of the radial projections 53b have equal extension in the radial direction.

The circumferential distance between the radial projections 53b (which defines the longitudinal flutes 53a) can be constant (like in the example illustrated in the attached figures) or at least two radial projections 53b can be spaced by a greater circumferential distance with respect to the circumferential distance that separates the other radial projections 53b, so as to define a longitudinal reference flute.

Figure 7:
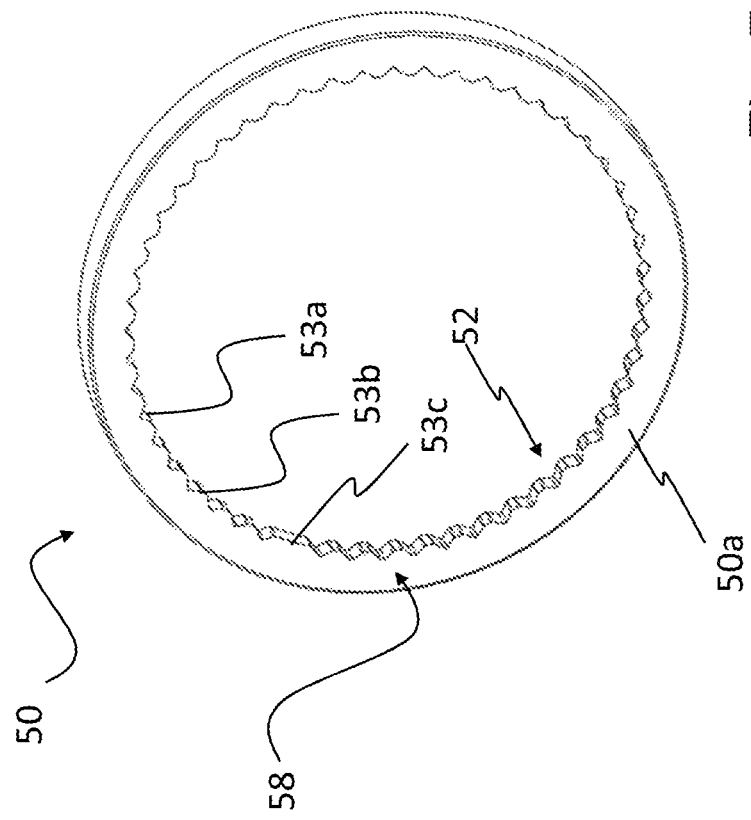

In the circumferential direction, the radial projections 53b can have the same circumferential extension or, preferably, at least one radial projection 53b can have a greater circumferential extension with respect to the other radial projections 53b to define a radial reference projection 53c (as illustrated in FIG. 7).

The radial reference projection 53c is configured to insert into the reference flute 33a of the first annular sector 33.

The spacer 50 is fitted onto the connection portion 30 with the second rotational coupling members 52 engaged at the first rotational coupling members 32 of the coupling portion 30.

In particular, the spacer 50 is fitted onto the first annular sector 33 and is rotatably constrained to it. The abutment surface 50b of the spacer 50 faces towards the spoke-holding flange 40, and is in contact and in abutment with the spoke-holding flange 40.

As illustrated in FIG. 4, the spacer 50 comprises a plurality of appendages 56 extending radially. The appendages 56 are in equal number to the appendages 42 of the spoke-holding flange 40 and have a shape such as to shield the insertion openings 42b of the seats 42a for holding spokes 13 in the axial direction.

The appendages 56 of the spacer 50 rest substantially on the appendages 42 of the spoke-holding flange 40, at least partially axially covering the insertion openings 42b of the seats 42a for holding spokes 13.

The appendages 56 of the spacer 50 make shoulders for the ends 13a of the spokes 13 inserted in the seats 42a of the spoke-holding flange 40, avoiding accidental axial withdrawals of the spokes 13 from the seats 42a.

It should be noted that the longitudinal reference flute 33a of the first annular sector 33, in combination with the radial reference projection 53c of the spacer 50, orient the spacer 50 on the first annular sector 33 so that the appendages 56 of the spacer are positioned at the appendages 42 of the spoke-holding flange 40.

Each appendage 56 of the spacer 50 comprises a small block 59 (FIG. 8) that extends in the axial direction from the side facing towards the spoke-holding flange 40.

The small blocks 59 are at least partially inserted in the insertion openings 42b of the seats 42a of the spoke-holding flange 40, so as to prevent dirt, mud and dust being able to slip into the seat 42a of the spoke 13.

Alternatively, instead of the appendages 56, the spacer 50 can comprise a single annular appendage that extends in the radial direction until it shields the insertion openings 42b of the seats 42a for holding spokes 13.

Figure 8:
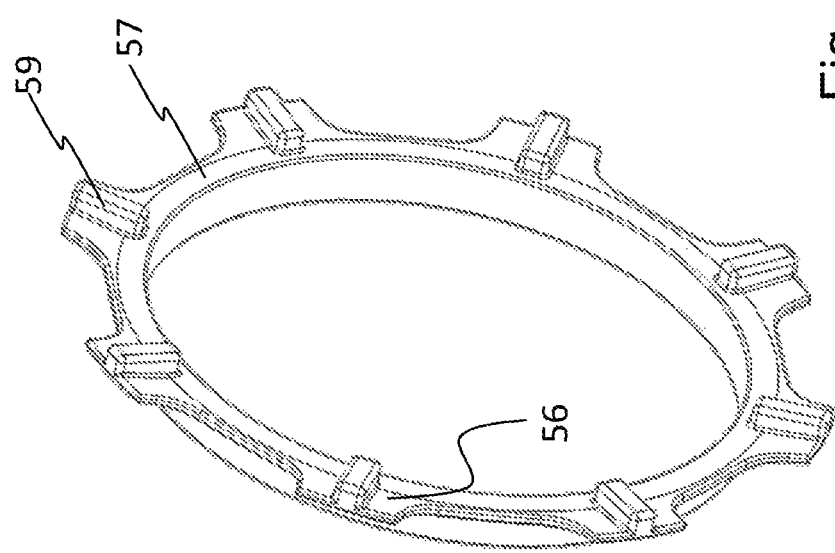
FIGS. 7 and 8 are perspective views of two components of a detail of the assembly of FIG. 1.

The appendages 56 of the spacer 50 can be made in one piece with the abutment surface 50a and the striking surface 50b (as illustrated in the example of FIG. 4), or they can be carried by an annular crown 57 distinct from the portion of spacer 50 having the abutment surface 50a and the striking surface 50b (as shown in the example of FIGS. 7 and 8).

In the latter case, the spacer comprises a substantially annular inner portion 58 carrying the abutment surface 50a and the striking surface 50b and the second rotational coupling members 52.

The annular crown 57 is arranged radially external with respect to the inner portion 58 and can be coupled with it by mechanical interference.

The annular crown 57 can for example be made of plastic or composite material.

As schematically illustrated in FIG. 3A, the striking surface 50a of the spacer 50 is axially arranged at the circumferential groove 38.

In particular, the striking surface 50a is axially comprised between the first and the second shoulder 38a, 38b of the circumferential groove 38.

The striking surface 50a is radially spaced from the bottom wall 38c of the circumferential groove 38 and can thus be machined, for example by chip removal, when the spacer 50 is already fitted on the first annular sector 33 of the hub 12.

In this way, the striking surface 50a of the spacer 50 is made perfectly planar and perfectly perpendicular to the longitudinal axis X.

The spacer 50 is made from any material that is not subject to oxidation even without surface coating layers. For example, the spacer 50 is made of aluminum alloys of group 6000 or of stainless steel.

The hub 12 can thus be made from a material that maximizes performance in terms of mechanical strength and lightness and can be coated with a layer that prevents the oxidation thereof. For example, the hub 12 can be made of aluminum alloys having high mechanical performance, like for example Ergal (aluminum alloys of group 7000) or Avional (aluminum alloys of group 2000).

Figure 3:
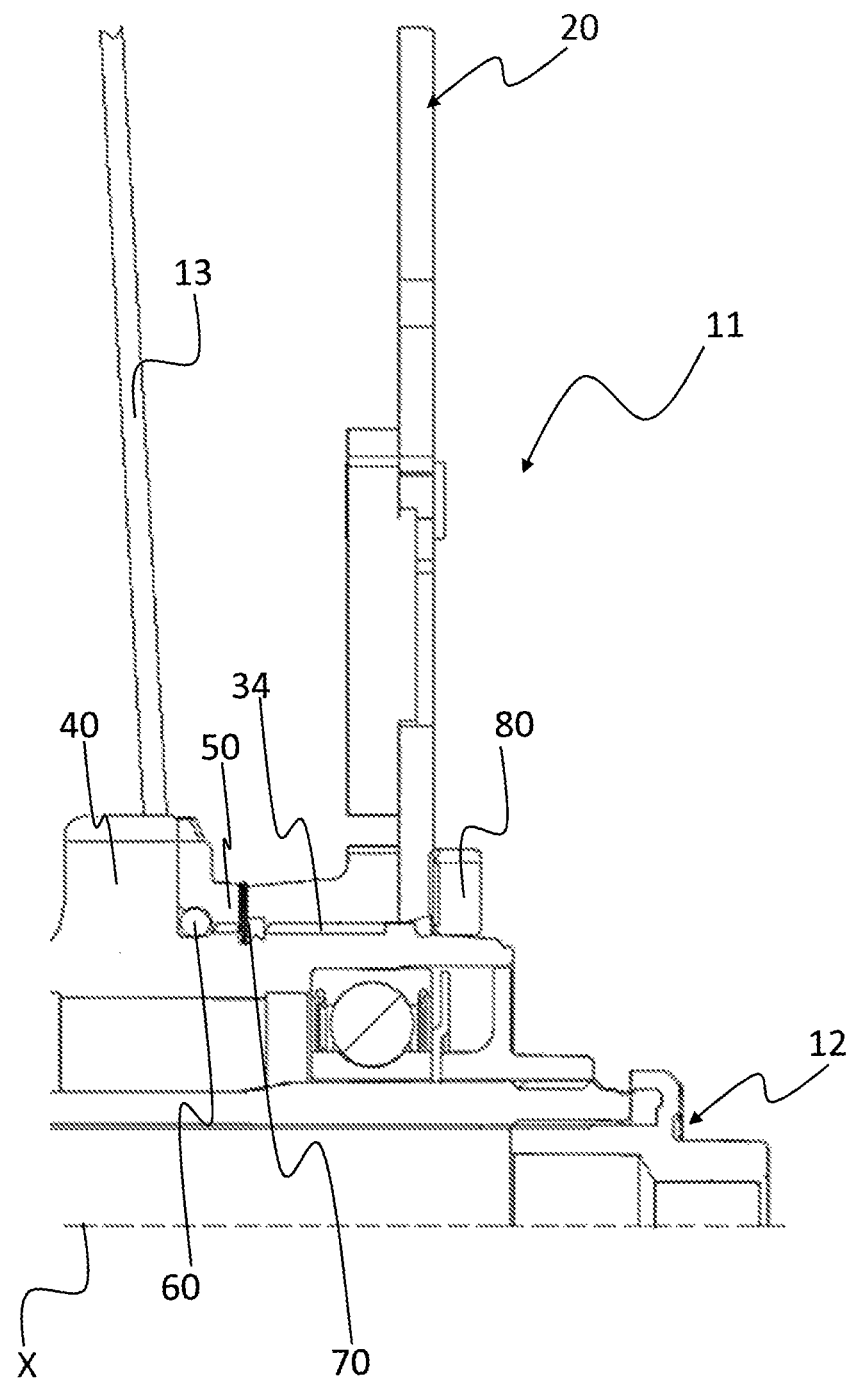
FIG. 3 is a section along the plane III-III of part of the portion of the bicycle wheel of FIG. 2.

The assembly 10 comprises an annular gasket 60, preferably toroidal, arranged between the hub 12 and the spacer 50 (FIG. 3).

Concerning this, a circumferential seat 39 for the annular gasket 60 is formed on the hub 12, axially inside the connection portion 30, between the first annular sector 33 and the spoke-holding flange 40 (FIG. 5).

As shown in FIG. 3A, the spacer 50, in axially inner position with respect to the second rotational coupling members 52, comprises a receiving seat 54 for the annular gasket 60.

The annular gasket 60 creates mechanical interference between the spacer 50 and the hub 12, allowing the spacer 50 to remain in position during the assembly of the hub assembly 10.

The brake disc 20 comprises a radially inner surface 22 matching the longitudinal flutes 34b and the radial projections 34c of the second annular sector 34.

The brake disc 20 is fitted onto the connection portion 30 of the hub and in particular on the second annular sector 34 of the latter.

The brake disc 20 is fitted onto the second annular sector 34 contacting the striking surface 50a of the spacer 50 that, acting as alignment surface, positions the brake disc 20 perfectly perpendicular to the longitudinal axis X.

It should be noted that the axial extension of the second annular sector 34 allows the use of brake discs of conventional thicknesses.

As illustrated in FIGS. 3 and 4, the assembly 10 comprises one or more thickening washers or spacers 70 that are axially arranged between the spacer 50 and the brake disc 20.

In particular, the thickening washers 70 are arranged axially external with respect to the spacer 50, in contact with the striking surface 50a.

Preferably, all of the thickening washers 70 have the same thickness, in other words the same dimension in the axial direction. The thickening washers 70 have a thickness and a shape that are calibrated, so as to have perfectly flat and parallel opposite surfaces.

The thickness of the thickening washers 70 is comprised between about 0.02 mm and about 0.2 mm, preferably it is 0.05 mm.

By selecting the number of thickening washers 70 arranged between the spacer and the brake disc 20, it is possible to position the brake disc 20 exactly centered between the pads of the brake caliper.

In axially outer position with respect to the second annular sector 34, a threaded portion 36 is provided, formed at a free end portion of the hub 12.

The assembly 10 comprises a lock nut 80, able to be screwed onto the threaded portion 36 of the hub 12, which goes into abutment on an axially outer face 20a of the brake disc 20 and axially holds it on the connection portion 30. The lock nut 80 clamps the brake disc 20 to the hub 12, packing together the brake disc 20, the spacer 50 and, when present, one or more thickening washers 70.

The mounting steps of the hub assembly 10 according to the present invention provide for mounting the spacer 50 with the relative annular gasket 60 on the connection portion 30 of the hub 12. During this operation, the spacer 50 is made to slide axially along the second annular sector 34 and reaches the first annular sector 33 on which it abuts, going into abutment against the spoke-holding flange 40.

As stated, the striking surface 50a of the spacer 50 is arranged at the circumferential groove 38.

At this point, the hub assembly 10 comprising the hub 12 and the spacer 50 is arranged on a machine tool and a levelling/grinding processing of the striking surface 50a of the spacer 50 mounted on the hub 12 is carried out.

The assembly 10 thus worked is removed from the machine tool and then possible thickening washers 70 are mounted on the connection portion 30 of the hub 12.

In particular, the thickening washers 70 are axially arranged in contact on the striking surface 50a of the spacer 50.

The brake disc 20 is then mounted on the connection portion 30 of the hub 12, and in particular on the second annular sector 34 so that the brake disc 20 contacts the striking surface 50a of the spacer 50 or the thickening washers 70 (if present).

Finally, the lock nut 80 is mounted on the hub 12 so as to axially lock the components already mounted on the hub 12.

Of course, those skilled in the art can bring numerous modifications and variants to the bicycle wheel hub of the present invention, as well as to the related hub assembly, in order to satisfy specific and contingent requirements, all of which are in any case encompassed by the scope of protection defined by the following claims.

What is claimed is:

1. A hub of a bicycle wheel comprising a connection portion that includes first rotational coupling members and receives a brake disc and at least one spoke-holding flange that is axially inner with respect to said connection portion, wherein said first rotational coupling members comprise a first annular sector, axially external with respect to said spoke-holding flange, and a second annular sector, axially external with respect to the first annular sector, and said connection portion has a circumferential groove axially arranged between the first and the second annular sectors of the first rotational coupling members, wherein the first and the second annular sectors comprise respective pluralities of radial projections, circumferentially spaced, having rectilinear extensions in the axial direction, and wherein the radial projections of the first annular sector are axially aligned to the radial projections of the second annular sector.

2. The hub according to claim 1, wherein the extension in the radial direction of a projection is equal to the extension in the radial direction of any other radial projection of the first and of the second annular sectors.

3. The hub according to claim 2, wherein the radial projections of the first annular sector have extensions in the radial and circumferential directions equal to that of the corresponding projections of the second annular sector.

4. The hub according to claim 1, wherein the extension in the axial direction of the second annular sector is greater than the extension in the axial direction of the first annular sector and wherein the extension in the axial direction of the circumferential groove is less than the axial extension of the first annular sector.

5. The hub according to claim 1, wherein said spoke-holding flange comprises a plurality of appendages extending radially each of which comprises a respective seat configured to receive an end of a spoke; said seats comprising an insertion opening facing towards said first annular sector of the first rotational coupling members.

6. The hub according to claim 1 further comprising a circumferential gasket seat axially arranged between the spoke-holding flange and the first annular sector of the first rotational coupling members.

7. A hub assembly of a bicycle wheel comprising:
a hub in accordance with claim 1;
a spacer comprising a striking surface, an abutment surface axially opposite the striking surface, and a central opening with second rotational coupling members that are configured to engage said first annular sector of said first rotational coupling members with said abutment surface facing towards said spoke-holding flange and with said striking surface axially arranged at said circumferential groove.

8. The hub assembly according to claim 7, wherein said striking surface is levelled/ground through chip removal machine processing.

9. The hub assembly according to claim 8, wherein said spacer is formed from a radially inner annular portion, comprising said striking surface, and from a radially outer annular portion, associated with said radially inner annular portion.

10. The hub assembly according to claim 7, wherein said abutment surface of the spacer contacts said spoke-holding flange.

11. The hub assembly according to claim 10, wherein said spoke-holding flange comprises a plurality of appendages extending radially each of which comprises a respective seat configured to receive an end of a spoke; said seats comprising an insertion opening facing towards said first annular sector of the first rotational coupling members and said spacer comprises a plurality of appendages extending radially; each appendage of the spacer comprising a small block at least partially inserted in a respective insertion opening of the seats of the spoke-holding flange.

12. The hub assembly according to claim 11, wherein said radially outer annular portion comprises said plurality of appendages extending radially.

13. The hub assembly according to claim 11, wherein said spacer is formed from a radially inner annular portion, comprising said striking surface, and from a radially outer annular portion, associated with said radially inner annular portion.

14. The hub assembly according to claim 10, wherein said spacer is formed from a radially inner annular portion, comprising said striking surface, and from a radially outer annular portion, associated with said radially inner annular portion.

15. The hub assembly according to claim 7, further comprising an annular gasket radially arranged between an outer surface of the hub and an inner surface of the spacer.

16. The hub assembly according to claim 15, wherein said spacer is formed from a radially inner annular portion, comprising said striking surface, and from a radially outer annular portion, associated with said radially inner annular portion.

17. The hub assembly according to claim 7, further comprising at least one second spacer arranged axially externally with respect to the spacer at said striking surface.

18. The hub assembly according to claim 17, wherein said spacer is formed from a radially inner annular portion, comprising said striking surface, and from a radially outer annular portion, associated with said radially inner annular portion.

19. The hub assembly according to claim 7, wherein said spacer is formed from a radially inner annular portion, comprising said striking surface, and from a radially outer annular portion, associated with said radially inner annular portion.

20. A hub of a bicycle wheel comprising a connection portion that includes first rotational coupling members and receives a brake disc and at least one spoke-holding flange that is axially inner with respect to said connection portion, wherein said first rotational coupling members comprise a first annular sector, axially external with respect to said spoke-holding flange, and a second annular sector, axially external with respect to the first annular sector, and said connection portion has a circumferential groove axially arranged between the first and the second annular sectors of the first rotational coupling members, wherein the first and the second annular sectors comprise respective pluralities of radial projections, circumferentially spaced, having rectilinear extensions in the axial direction, and the radial projections of the first annular sector have extensions in the radial and circumferential directions equal to that of the corresponding projections of the second annular sector.

21. A hub of a bicycle wheel comprising a connection portion that includes first rotational coupling members and receives a brake disc and at least one spoke-holding flange that is axially inner with respect to said connection portion, wherein said first rotational coupling members comprise a first annular sector, axially external with respect to said spoke-holding flange, and a second annular sector, axially external with respect to the first annular sector, and said connection portion has a circumferential groove axially arranged between the first and the second annular sectors of the first rotational coupling members, and a circumferential gasket seat axially arranged between the spoke-holding flange and the first annular sector of the first rotational coupling members.

* * * * *